United States Patent [19]

Basseres et al.

[11] Patent Number: 5,395,646
[45] Date of Patent: Mar. 7, 1995

[54] PROCESS FOR THE PROTECTION OF SOLID SURFACES, PARTICULARLY COASTAL AREAS, AGAINST POLLUTION BY HYDROCARBONS

[75] Inventors: Anne Basseres; Alain Ladousse, both of Pau, France

[73] Assignee: Societe Nationale Elf Aquitaine, Courbevoie, France

[21] Appl. No.: 140,129

[22] PCT Filed: Mar. 9, 1993

[86] PCT No.: PCT/FR93/00230
§ 371 Date: Apr. 5, 1994
§ 102(e) Date: Apr. 5, 1994

[87] PCT Pub. No.: WO93/18109
PCT Pub. Date: Sep. 16, 1993

[30] Foreign Application Priority Data

Mar. 11, 1992 [FR] France .................................. 92 02886

[51] Int. Cl.⁶ .............................................. C09K 3/32
[52] U.S. Cl. ...................................... 427/136; 427/154; 210/925
[58] Field of Search ................ 427/136, 154; 210/922, 210/925; 405/264

[56] References Cited

U.S. PATENT DOCUMENTS

| | | | |
|---|---|---|---|
| 3,503,774 | 3/1970 | Weymouth | 117/6 |
| 4,022,633 | 5/1977 | Schneider | 106/208 |
| 4,154,553 | 5/1979 | Takashi | 405/264 |
| 4,327,266 | 8/1982 | Norman et al. | 427/154 |
| 4,437,993 | 3/1984 | Lindorfer et al. | 210/925 |
| 4,579,175 | 1/1986 | Grodde et al. | 166/295 |
| 4,743,288 | 5/1988 | Hirsbrunner | 71/28 |
| 5,017,237 | 5/1991 | Svensson | 427/154 |
| 5,039,414 | 8/1991 | Mueller et al. | 210/610 |

OTHER PUBLICATIONS

Amoco Cadiz Oil Spill, Marine Pollution Bulletin, vol. 9, No. 11, Nov. 1978.
Biotechnology of Marine Polysaccharides, The Use of Water-Soluble Polymers in Oil Field Applications: Hydraulic Fracturing, pp. 250-280, Apr. 1984. Translation of JP 05-070796.
JP 05-070796A. Abstract Only.

Primary Examiner—Shrive Beck
Assistant Examiner—Erma Cameron
Attorney, Agent, or Firm—Oblon, Spivak, McClelland, Maier & Neustadt

[57] ABSTRACT

A process affording protection to solid surfaces and especially coastal areas against hydrocarbon pollution involves applying a protective layer composed of polysaccharides containing pendant carboxyl groups, such as alginates or lightly methylated pectins.

14 Claims, No Drawings

PROCESS FOR THE PROTECTION OF SOLID SURFACES, PARTICULARLY COASTAL AREAS, AGAINST POLLUTION BY HYDROCARBONS

This invention relates to a process for the protection of solid surfaces, and most particularly of coastal areas and banks, against pollution by hydrocarbons.

The protection of coastal areas against the effects of accidental spillages of hydrocarbons is provided by mechanical or chemical means. Mechanical means consist of the deployment of dams or nets to prevent the hydrocarbon slick from reaching the banks. Chemical means are aimed at breaking up the slick of crude before it reaches the coast. Chemical processes make use of dispersants by themselves or of absorbents.

If the pollution due to hydrocarbons has already reached the coast, the processes used have only a curative effect. They consist in the cleaning of the banks using jets of cold or hot water, or in shovelling.

There are also physicochemical processes employing absorbents or else washing agents. This treatment may be supplemented by the addition of nutrient substances whose purpose is to promote the development of the microorganisms responsible for the biodegradation of hydrocarbons. This process is described in French Patents 2,490,672 and 2,512,057.

Protection of coastal areas before the arrival of the hydrocarbon slick has also been envisaged. This involves protecting rocks or shingle forming the beaches with a coating which prevents the adhesion of hydrocarbons. Among the products tested in this application we can mention sodium silicate, xanthan gum and polyvinyl acetate. Among these products, only polyvinyl acetate has been considered as being appropriate for such an application (C. L. Foget et al - Technical Report EPA-60012-84-085). At the same time, the use of a vinyl chloride polymer in a marine environment encounters fears concerning the harmful effect of the traces of monomer which the polymer unavoidably contains. The effect of the other recommended products has been too short-lived. Washing-out of the products by seawater reduces the effectiveness of the protection in practice to the duration of one tide.

We have now found a process which makes it possible to protect the coast durably against the deposition of hydrocarbons and does so without danger to the environment, by employing a natural and entirely biodegradable product. This process can also be employed for the protection of other solid surfaces, such as cement or plastic floors.

For this purpose, this invention relates to a process for the protection of solid surfaces against the deposition of oleophilic materials by application to the said surfaces of a protective layer, characterized in that the protective layer is made up of at least one polysaccharide containing free carboxyl groups, chosen from the group consisting of alginates and slightly methylated pectins taken by themselves or mixed.

The alginates are extracted from brown seaweed present on most rocky coasts. They are harvested chiefly in the North Atlantic, in France on the coasts of Brittany.

The alginates are obtained from this brown seaweed by demineralization in an acidic medium and extraction of the alginate in an alkaline medium followed by a precipitation of alginic acid.

It is also possible to employ alginates of bacterial origin.

Alginic acid is a polyuronide, consisting of a chain sequencing of two hexuronic acids, beta-D-mannuronic acid and alpha-L-guluronic acid.

Studies using partial hydrolysis and carbon-13 NMR have shown that these two monomers are distributed in blocks of about twenty units. The various seaweeds contain very variable proportions of mannuronic acid/guluronic acid. Alginates with a high content of guluronic acid are advantageously employed.

Since alginic acid is insoluble in water, use is made of water-soluble alginates obtained by neutralization of the acid with a basic compound, generally an alkaline base.

The pectins are extracted chiefly from apple marc or lemon peel by an acidic treatment followed by precipitation with alcohol. The pectin obtained consists essentially of alpha-D-galacturonic acids partially esterified with methanol. It also contains small quantities of beta-L-rhamnose and of neutral sugars such as galactose, arabinose and xylose.

The pectins obtained after acidic treatment and precipitation have a degree of esterification higher than 50, which means that more than 50% of the carboxyl groups are esterified with methanol. These pectins, called "highly methylated pectins" or "HM" are not suitable for the process according to the invention.

They must be converted into "weakly methylated pectins" or "WM" by demethylation by an acidic or alkaline route. A solution of sodium carbonate is generally employed. The "WM" pectins obtained have a degree of esterification lower than 50. Pectins whose degree of esterification is lower than 40 are advantageously employed.

Depending on the degree of purification, both the alginates and the pectins can be accompanied by other polysaccharides. This does not decrease their effectiveness.

The process of the invention is particularly suited for the protection of the coastal areas against the accidental spillage of hydrocarbons. In this respect it is an effective means of combating the "black tides" and any spillage of hydrocarbons at sea.

The process can be employed for the protection of coastal areas of very diverse nature, consisting of sediments such as rocks, shingle, sand or marshes.

The effectiveness of the film does not disappear after the first tide but persists for a number of days after the application. This makes it possible to envisage spraying the bank a few days before a black tide reaches the coast.

The process is also highly effective for the protection of the banks of rivers and of lakes against the accidental spillage of oleophilic materials.

The process can also be applied to the prevention of pollution of floors, for example made of cement or of plastic, by accidentally spilt oleophilic materials. These oleophilic materials may be, for example, crude oils, sump oils or vegetable oils.

The process is very simple to use. An aqueous solution of polysaccharide containing free carboxyl groups is sprayed, using a conventional sprayer, onto the areas to be protected, so as to deposit a film which is as complete as possible. This film decreases the adhesion of the oleophilic materials to the solid surfaces to be protected.

The concentration of the solutions to be sprayed is a function of the polysaccharide employed. The most efficient concentration is between 1 and 5 g/l and preferably between 1.5 and 4.5 g/l in the case of the alginates and between 5 and 15 g/l, preferably between 8 and 12 g/l in the case of pectins.

The quantity of liquid to be sprayed is calculated to permit the deposition of approximately 0.5 to 1.5 g of alginate and from approximately 2 to 5 g of pectin per $m^2$ of surface to be protected.

The formation of the protective film is promoted by the presence in the protective layer of 0.1 to 30% by weight, and preferably from 0.5 to 20% by weight, of at least one alkaline-earth metal, added or already present in the natural medium. Calcium or strontium will preferably be employed, which is present especially in the rocks, shingle and seawater in the case of the coastal areas, or else in the fibre-cement floors.

When the surface to be protected does not contain any alkaline-earth metals, for example plastic floors, it is preferable to add some to the solution to be sprayed. In general between 100 and 300 mg and preferably between 150 and 200 mg of an alkaline-earth metal are added in the form of water-soluble salt. The preferred metals are calcium and strontium in the form of oxides and chlorides, taken by themselves or mixed.

The following examples illustrate the invention without, however, limiting it.

EXAMPLE 1

Washed and dried shingle (8–10 cm in diameter), is arranged on a grid, itself installed in aquariums of 17 cm height. The polysaccharides are dissolved at the concentrations shown in Table I and are then sprayed onto the limestone shingle (their quantity is checked by weighing). After 12 hours' drying, a known quantity of petroleum (Arabian Light 150) is sprayed onto the shingle (its quantity checked by weighing). Washing with cold water under pressure is then performed and the quantity of petroleum detached is estimated after recovery with an absorbent (polyurethane powder), extraction with chloroform and reading by IR at 3420 nm.

The polysaccharides employed are an alginate (Satialgine from Sanofi Bioindustries), an HM pectin (MRS-34) and a pectin (LMNA/P 3450 NA95), also from Sanofi.

TABLE 1

| Concentration | Alginate 2 g/l | WM pectin 10 g/l | 2 g/l | HM pectin 10 g/l | 2 g/l | Difference from control |
|---|---|---|---|---|---|---|
| % Recovery | 60% | 60% | 50% | 47% | 46% | 46% |
| Control | 14% | 14% | 4% | 1% | 0 | |

In the control test the shingle has no protective layer.

Table 1 shows the superiority of the weakly methylated pectin. The most efficient concentration is 2 g/l in the case of the alginate and 10 g/l in the case of pectin.

EXAMPLE 2

We have repeated example 1, employing a fibre-cement sheet instead of the shingle.

TABLE 2

| | Difference from control |
|---|---|
| Pectin-WM 10 g/l | 58% |
| Alginate 2 g/l | 58% |

EXAMPLE 3 (Unaged Arabian Light)

The efficiency of the alginate (2 g/l) and of the pectin (10 g/l) is tested in a 25-liter tide simulator in which the tide is adjusted so as to correspond to natural tides. The seawater used to feed the tanks is taken directly from the ocean, continuously throughout the tests. According to the analyses, it contains 380 mg/l of calcium. The tanks are provided with a pierced central container to allow the water to flow through the sediment at low tide.

The sediments (shingle) are placed in the central container in a layer of 7 to 10 cm. The tide simulator allows the sediments to be immersed alternately. The tanks are provided with an overflow making it possible to recover the detached crude, in order that it should not redeposit on the sediments at low tide.

A known quantity of film-forming product is sprayed onto a known quantity of sediment, and is left to dry for the duration of one tide (6 hours). The crude (Arabian Light) is then deposited onto the sediment, its quantity estimated by weight difference, and the tide simulator is switched on. At each application a control without any film-forming product is also observed.

The efficiency of the detachment is evaluated after two tides (24 h) by estimating the quantity of crude which has remained on the sediment. This quantification is performed after extraction with chloroform, evaporation and weighing. The results of the various tests are given in Table 3.

The efficiency of the product is expressed as the removal ratio of the crude on the sediment.

TABLE 3

| | % Removal after 2 tide cycles (24 hours) | Difference from control % |
|---|---|---|
| Alginate (2 g/l) | 73.2 | 12.9 |
| Pectin (10 g/l) | 78.8 | 7.5 |

EXAMPLE 4 (Aged and emulsified Arabian Light)

Since the use of unaged crude does not correspond to reality, it was decided to test the effectiveness of the two products on various states of crude: aged and emulsified. In fact, after remaining on the surface of the water, the crude is aged and emulsified.

We have employed an aged crude (Arabian Light aged 7 days under UV) and inverse emulsion of Arabian Light (35% crude - 65% water). The efficiency tests are carried out in the same conditions and with the same procedure as that described during Example 3.

The results obtained are in Table 4.

TABLE 4

| Film-forming products | % Removal after 2 tide cycles (24 hours) | Difference from control % |
|---|---|---|
| AGED CRUDE | | |
| Alginate (2 g/l) | 76.1 | 23.0 |
| Control | 53.1 | |
| Pectin (10 g/l) | 76.7 | 26.8 |
| Control | 49.9 | |
| EMULSIFIED CRUDE | | |
| Alginate (2 g/l) | 73.3 | 30.2 |
| Control | 43.1 | |
| Pectin (10 g/l) | 78.0 | 26.9 |
| Control | 51.1 | |

The results obtained with the use of aged and emulsified crude are better than with the fresh crude. In fact, a difference in adhesion of 23 to 30% is obtained when compared with a control without any film-forming products.

EXAMPLE 5

The use of such an invention is realistic if the products employed form a film which stands up to washing-out by the tides for a certain period which is sufficiently long to envisage a treatment a few tides before the petroleum slick. The study of the resistance of these products to washing-out is carried out with oxidized crude (Arabian Light) in the tide simulator, in the same conditions as previously.

Only the duration of the experiments is changed: an estimation of the removal is performed after 24 h, 48 h, 96 h (4 d), 120 h (5 d) and 144 h (6 d).

The results are in Table 5 below.

TABLE 6-continued

| Substrate | % Removal of the crude |
|---|---|
| Limestone-free shingle | 61% |

Here, the protection provided by the alginate is far superior on the limestone shingle containing calcium, since 24% more of crude petroleum is recovered than on the limestone-free shingle.

In the second type of tests the operation is carried out with limestone-free shingle, containing especially calcium; only the nature of the water brought into contact is changed: on the one hand, distilled and hence limestone-free water is employed and, on the other hand, distilled water to which calcium chloride has been added, and hence so-called limestone water.

The results are given in Table 7 below:

TABLE 7

| Nature of the water | Calcium concentration (mg/l) | % Removal |
|---|---|---|
| Water without calcium | 0 | 54 |
| Water with calcium | 250 | 72 |

As in the first tests, it is found that the presence of calcium, in this case in water, increases the recovery of the crude petroleum and hence the efficiency of protection by the alginate by almost 20%.

These tests therefore confirm the favourable effect of the presence of limestone and especially of calcium on the protection by the alginates.

TABLE 5

| | Removal of the crude % | | | | | | | | | |
|---|---|---|---|---|---|---|---|---|---|---|
| Time | % Remov. 24 h | % Diff. Control | % Remov. 48 h | % Diff. Control | % Remov. 96 h | % Diff. Control | % Remov. 120 h | % Diff. Control | % Remov. 144 h | % Diff. Control |
| Alginate (2 g/l) | 76.1 | 23 | 77.1 | 24 | 64.5 | 11.4 | 42.9 | 15.3 | 60.7 | 7.6 |
| Control | 53.1 | | 53.1 | | 53.1 | | 27.6 | | 53.1 | |
| Pectin (10 g/l) | 76.7 | 26.8 | 79.1 | 29.2 | 68.1 | 14.7 | 66.3 | 11 | 66.2 | 12.9 |
| Control | 49.9 | | 49.9 | | 53.1 | | 51.5 | | 53.1 | |

Although the product loses its effectiveness in the course of time, the efficiency remains advantageous after 6 days in tidal conditions: 10% higher than the control. This loss of effectiveness, on the other hand, proves that the product finally disappears, by virtue of its biodegradable nature.

EXAMPLE 6

In order to evaluate the improvement brought about by the presence of calcium in the protective layer based on alginate, two types of tests were carried out by the same apparatus as that described in Example 3.

The first tests were carried out with seawater containing 380 mg/l of calcium in saline form, in the presence of two types of shingle, limestone shingle and limestone-free shingle. The results are given in Table 6 below:

TABLE 6

| Substrate | % Removal of the crude |
|---|---|
| Limestone shingle | 85% |

We claim:

1. A process for the protection of the surfaces of rocks, shingle, sand or marshes present in coastal areas or on the banks of rivers or lakes against the deposition of oleophilic materials which comprises applying a protective layer to the said surfaces, characterized in that the protective layer is made up of at least one polysaccharide containing free carboxyl groups chosen from the group consisting of alginates and pectins in which the degree of esterification of the pectin is lower than 50%.

2. Process according to claim 1, characterized in that the polysaccharide applied includes a pectin in which the degree of esterification of the pectin is lower than 40%.

3. Process according to claim 1, characterized in that the oleophilic material is a hydrocarbon.

4. Process according to claim 1, characterized in that the protective layer is applied by spraying onto the surfaces a solution containing between 1 and 5 g/l of alginate.

5. Process according to claim 1, characterized in that the protective layer is applied by spraying onto the surfaces a solution containing between 5 and 15 g/l of the pectin.

6. Process according to claim 4, characterized in that the protective layer contains between 0.5 and 1.5 g of alginate per m² of surface to be protected.

7. Process according to claim 5, characterized in that the protective layer contains between 2 and 5 g of the pectin per m² of surface to be protected.

8. Process according to one of claims 1, 2 or 3 to 7, characterized in that the protective layer contains from 0.1 to 30% by weight by weight of at least one alkaline-earth metal.

9. Process according to claim 8, characterized in that the alkaline-earth metals are calcium and strontium, taken alone or as a mixture thereof.

10. Process according to claim 8, characterized in that the solution contains between 100 and 300 mg per liter of at least one alkaline-earth metal.

11. Process according to claim 3 in which the oleophilic material is a crude oil.

12. Process according to claim 4 in which the solution contains between 1.5 and 4.5 g/l of alginate.

13. Process according to claim 5 in which the solution contains between 8 and 12 g/l of the pectin.

14. Process according to claim 10 in which the solutions contain 150 to 200 mg of calcium per liter of solution.

* * * * *